United States Patent
Kim et al.

(10) Patent No.: US 11,928,008 B2
(45) Date of Patent: Mar. 12, 2024

(54) WATCHDOG SYSTEM, WATCHDOG METHOD, AND BATTERY MANAGEMENT SYSTEM COMPRISING WATCHDOG SYSTEM

(71) Applicant: LG CHEM, LTD., Seoul (KR)

(72) Inventors: Hyo Jung Kim, Daejeon (KR); Jongshik Baek, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 268 days.

(21) Appl. No.: 17/430,520

(22) PCT Filed: Nov. 4, 2020

(86) PCT No.: PCT/IB2020/060337
§ 371 (c)(1),
(2) Date: Aug. 12, 2021

(87) PCT Pub. No.: WO2021/048835
PCT Pub. Date: Mar. 18, 2021

(65) Prior Publication Data
US 2022/0129341 A1  Apr. 28, 2022

(30) Foreign Application Priority Data
Sep. 11, 2019 (KR) ........................ 10-2019-0113110

(51) Int. Cl.
*G06F 11/00* (2006.01)
*G06F 9/4401* (2018.01)
(Continued)

(52) U.S. Cl.
CPC ........ *G06F 11/0757* (2013.01); *G06F 9/4401* (2013.01); *G06F 11/073* (2013.01); *G06F 12/123* (2013.01)

(58) Field of Classification Search
CPC .............. G06F 11/0757; G06F 11/073; G06F 11/0754; G06F 11/0751
See application file for complete search history.

(56) References Cited

U.S. PATENT DOCUMENTS 6,385,743 B1   5/2002  Huckfeldt et al.
10,067,834 B1   9/2018  Montero et al.
(Continued)

FOREIGN PATENT DOCUMENTS

EP   2 673 171 B1   5/2017
EP   3 671 236 A1   6/2020
(Continued)

OTHER PUBLICATIONS

Extended European Search Report dated Mar. 25, 2022, of the corresponding European Patent Application No. 20862313.2.
(Continued)

*Primary Examiner* — Katherine Lin
(74) *Attorney, Agent, or Firm* — Birch, Stewart, Kolasch & Birch, LLP

(57) ABSTRACT

Provided is a watchdog system including: a software area including a bootloader area and an application area, and a shared memory area storing the last watchdog refresh timing; and an external watchdog module refreshing a watchdog when a transmitted refresh request timing corresponds to window open time in response to a refresh request transmitted from either the bootloader area or the application area and based on the last watchdog refresh timing transmitted from the shared memory area and the transmitted refresh request timing.

13 Claims, 5 Drawing Sheets

(51) Int. Cl.
   *G06F 11/07*      (2006.01)
   *G06F 12/123*     (2016.01)

(56) References Cited

U.S. PATENT DOCUMENTS

| | | |
|---|---|---|
| 2013/0067287 A1 | 3/2013 | Yoshikawa et al. |
| 2013/0290789 A1 | 10/2013 | Wen |
| 2014/0013150 A1 | 1/2014 | Kaltenegger et al. |
| 2014/0082434 A1 | 3/2014 | Knight et al. |
| 2014/0149809 A1 | 5/2014 | Bisht et al. |
| 2017/0010896 A1 | 1/2017 | Alari et al. |
| 2018/0181457 A1 | 6/2018 | Ebisawa et al. |
| 2019/0162760 A1 | 5/2019 | Yamahira et al. |
| 2020/0408831 A1 | 12/2020 | Yoon et al. |

FOREIGN PATENT DOCUMENTS

| | | | |
|---|---|---|---|
| JP | 2002-140209 A | 5/2002 | |
| JP | 3536293 B2 | 6/2004 | |
| JP | 2009-218784 A | 9/2009 | |
| JP | 2009-289119 A | 12/2009 | |
| JP | 2013-541089 A | 11/2013 | |
| JP | 2018-107679 A | 7/2018 | |
| JP | 2019-101515 A | 6/2019 | |
| KR | 10-1999-0067801 A | 8/1999 | |
| KR | 10-2014-0071687 A | 6/2014 | |
| KR | 10-1491347 B1 | 2/2015 | |
| KR | 10-2019-0072276 A | 6/2019 | |
| WO | WO-2016020640 A1 * | 2/2016 | .......... G06F 11/0757 |
| WO | WO 2019/117512 A1 | 6/2019 | |

OTHER PUBLICATIONS

Freescale Semiconductor, "Power System Basis Chip with High Speed CAN transceiver," Document No. MC33907_08, Rev. 3.0, Feb. 2014, pp. 1-107.
International Search Report (PCT/ISA/210) issued in PCT/IB2020/060337, dated Feb. 24, 2021.

* cited by examiner

WATCHDOG SYSTEM, WATCHDOG METHOD, AND BATTERY MANAGEMENT SYSTEM COMPRISING WATCHDOG SYSTEM

TECHNICAL FIELD

Cross Citation with Related Application(s)

This application claims the benefit of Korean Patent Application No. 10-2019-0113110 filed on Sep. 11, 2019 with the Korean Intellectual Property Office, the disclosure of which is incorporated herein by reference in its entirety.

The present invention relates to a watchdog system, a watchdog method, and a battery management system including the watchdog system.

BACKGROUND ART

For a high level of system management, a watchdog may be performed in a window mode. For a higher level of system safety, not only a watchdog module inside a main control unit (MCU) of a battery management system, but also a watchdog module of an application-specific integrated circuit (ASIC) outside the MCU of the battery management system may be performed in interlock with the watchdog module of the MCU In the window mode, the watchdog module may provide a watchdog service only during window open time, and the watchdog service attempted during window close time may thus be recognized to be failed. If the watchdog is not refreshed for a predetermined time, the system is supposed to be reset. An object of the watchdog is to allow a safety disable operation (for example, reset) to be performed when the watchdog is not normally refreshed due to a system problem or the like.

When a specific sequence that requires long time is performed, the watchdog service may be performed in the middle of its coding to prevent the reset due to the watchdog. Conventionally, it has been difficult to determine the exact window open time.

For example, when a reprogramming/software flash is performed, a transaction may be made between a bootloader and an application which are software components different from each other. Here, if the watchdog service is provided by the ASIC outside the MCU of the battery management system, it may be difficult to determine the exact window open time. Therefore, the safety disable operation such as the reset may be performed.

That is, it may be difficult to determine the window open time even if there is no problem in the system, and an accidental safety disable situation may thus occur.

DISCLOSURE

Technical Problem

The present invention has been made in an effort to provide a watchdog system having advantages of solving a problem in which an accidental safety disable situation occurs because it is difficult to determine window open time even though there is no problem in the system, a watchdog method, and a battery management system including the watchdog system.

Technical Solution

According to an exemplary embodiment of the present invention, a watchdog system includes: a main control unit (MCU) of a battery management system (BMS) including a software area including a bootloader area and an application area, and a shared memory area storing the last watchdog refresh timing; and an external watchdog module configured to refresh a watchdog when a transmitted refresh request timing corresponds to a window open time in response to a refresh request transmitted from either the bootloader area or the application area and based on a last watchdog refresh timing transmitted from the shared memory area and the transmitted refresh request timing.

Either the bootloader area or the application area may be configured to generate the refresh request, determine whether its refresh request timing corresponds to the window open time of the window time of the external watchdog module based on a timing in which the refresh request is generated and the last watchdog refresh timing obtained from the shared memory area, and transmit the refresh request to the external watchdog module in response to the generated refresh request timing corresponding to the window open time.

The external watchdog module may be configured to update a timing in which the watchdog is refreshed as the last watchdog refresh timing in the shared memory area.

The MCU may be configured to determine which one of the bootloader area and the application area performs the refresh request and obtains the last watchdog refresh timing from the shared memory area based on a program flow in the software area.

According to another exemplary embodiment of the present invention, a watchdog method of a watchdog system including a bootloader area, an application area, a shared memory area, and an external watchdog module, includes: transmitting a refresh request to the external watchdog module by either the bootloader area or the application area; obtaining the last watchdog refresh timing from the shared memory area, and determining whether a received refresh request timing corresponds to a window open time in which a watchdog refresh is able to be performed, by the external watchdog module; refreshing the watchdog based on the watchdog refresh request in response to the received refresh request timing corresponding to the window open time as a result of the determination of the external watchdog module; and storing a timing of the refreshing of the watchdog in the shared memory area as the last watchdog refresh timing.

The watchdog method may further include performing no watchdog refresh in response to the received refresh request timing corresponding to window close time in which the watchdog refresh is unable to be performed as a result of the determination of the external watchdog module.

The transmitting of the refresh request to the external watchdog module by either the bootloader area or the application area may include: generating the watchdog refresh request, and obtaining the last watchdog refresh timing from the shared memory area, by either the bootloader area or the application area; determining whether a generated refresh request timing corresponds to the window open time based on a difference between the generated refresh request timing and the obtained last watchdog refresh timing, by either the bootloader area or the application area; and transmitting the refresh request to the external watchdog module in response to the generated refresh request timing corresponding to the window open time as a result of the determination of either the bootloader area or the application area.

The transmitting of the refresh request to the external watchdog module by either the bootloader area or the application area may further include ignoring the refresh request in response to the generated refresh request timing not corresponding to the window open time, as a result of the determination of either the bootloader area or the application area.

The watchdog method may further include determining which one of the bootloader area and the application area performs the refresh request and obtains the last watchdog refresh timing from the shared memory area based on a program flow in the software area.

According to yet another exemplary embodiment of the present invention, a battery management system managing a battery pack including a plurality of battery cells, includes: at least one application-specific integrated circuit (ASIC) measuring voltages of the plurality of battery cells and performing cell balancing for the plurality of battery cells; and a main control unit (MCU) controlling the at least one ASIC. The MCU includes a software area including a bootloader area and an application area, and a shared memory area storing the last watchdog refresh timing. The at least one ASIC includes an external watchdog module refreshing a watchdog when a transmitted refresh request timing corresponds to window open time in response to a refresh request transmitted from either the bootloader area or the application area and based on the last watchdog refresh timing transmitted from the shared memory area and the transmitted refresh request timing.

Either the bootloader area or the application area may be configured to generate the refresh request, determine whether its refresh request timing corresponds to the window open time of the window time of the external watchdog module based on a timing in which the refresh request is generated and the last watchdog refresh timing obtained from the shared memory area, and transmit the refresh request to the external watchdog module if the generated refresh request timing corresponds to the window open time.

The external watchdog module may update a timing in which the watchdog is refreshed as the last watchdog refresh timing in the shared memory area.

Either the bootloader area or the application area may be determined based on a program flow in the software area.

Advantageous Effect

According to the present invention, a watchdog system having advantages of solving a problem in which an accidental safety disable situation occurs because it is difficult to determine window open time even though there is no problem in the system, a watchdog method, and a battery management system including the watchdog system can be provided.

MODE FOR INVENTION

Figure 1:
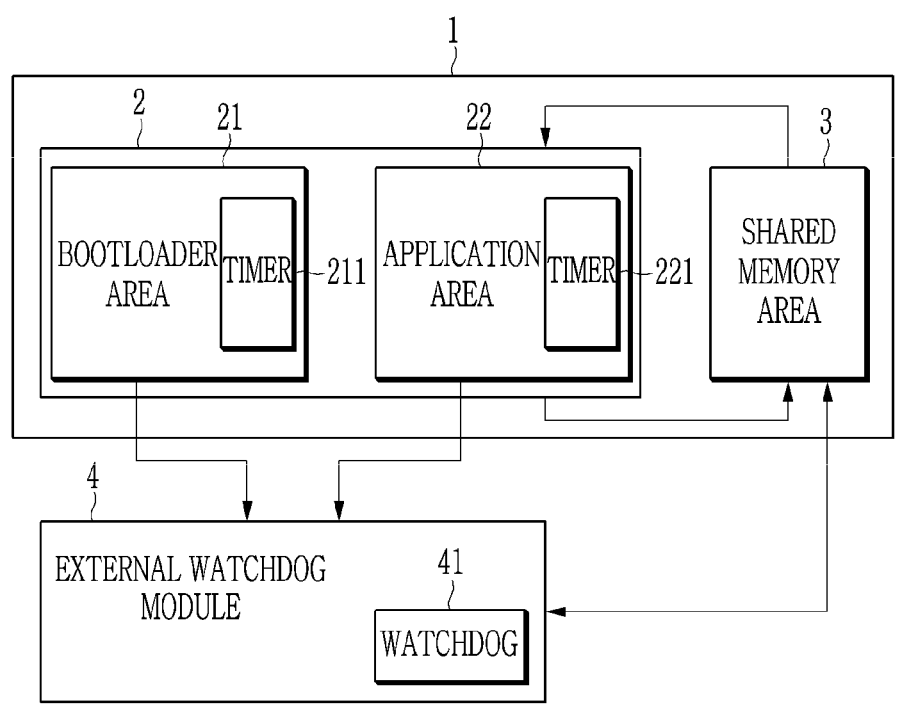
FIG. 1 is a block diagram showing a watchdog system according to an exemplary embodiment.

The present invention may further include a routine to calculate window open time of a watchdog module, in which a watchdog service is performed only during the window open time based on the routine. Even though the watchdog service is attempted at any timing, there is no situation where a fault occurs due to window time.

The present invention may set a specific memory area, for example, a timing calculation area in a shared memory to avoid the fault from occurring due to the wrong window time if the watchdog service is attempted in a situation where a transaction is made between a bootloader and an application which are software components different from each other. Through the shared memory and an interface with the shared memory, the different modules may synchronize their timings with each other, and all the modules may thus perform the watchdog service at the exact timing. That is, it is possible to prevent an accidental safety disable situation from occurring due to an error in calculating the window time.

Hereinafter, exemplary embodiments disclosed in the present specification are described in detail with reference to the accompanying drawings, and components that are the same as or similar to each other are denoted by the same or similar reference numerals, and an overlapped description therefor is omitted. Terms "module" and/or "unit" for components used in the following description are used only to easily make the invention. Therefore, these terms do not have meanings or roles distinguished from each other in themselves. Further, in describing the exemplary embodiments of the present invention, in a case where it is decided that a detailed description for the known art related to the present invention may obscure the gist of the exemplary embodiments of the present invention, the detailed description is omitted. Furthermore, it should be understood that the accompanying drawings are provided only in order to allow the embodiments of the present invention to be easily understood, and the spirit of the present invention is not limited by the accompanying drawings, but includes all the modifications, equivalents, and substitutions included in the spirit and scope of the present invention.

Terms including ordinal numbers such as 'first', 'second', and the like, may be used to describe various components. However, these components are not limited by these terms. The terms are used only to distinguish one component from another component.

It is to be understood that when one element is referred to as being "connected to" or "coupled to" another element, it may be connected directly to or coupled directly to another element, or be connected to or coupled to another element having other element interposed therebetween. On the other hand, it is to be understood that when one element is referred to as being "connected directly to" or "coupled directly to" another element, it may be connected to or coupled to another element without any other element interposed therebetween.

It is to be understood that terms "include" or "have" used in the present specification specify the presence of features, numerals, steps, operations, elements, parts mentioned in the present specification, or combinations thereof, but do not preclude the presence or addition of one or more other features, numerals, steps, operations, elements, parts or combinations thereof.

FIG. 1 is a block diagram showing a watchdog system according to an exemplary embodiment.

Figure 2:
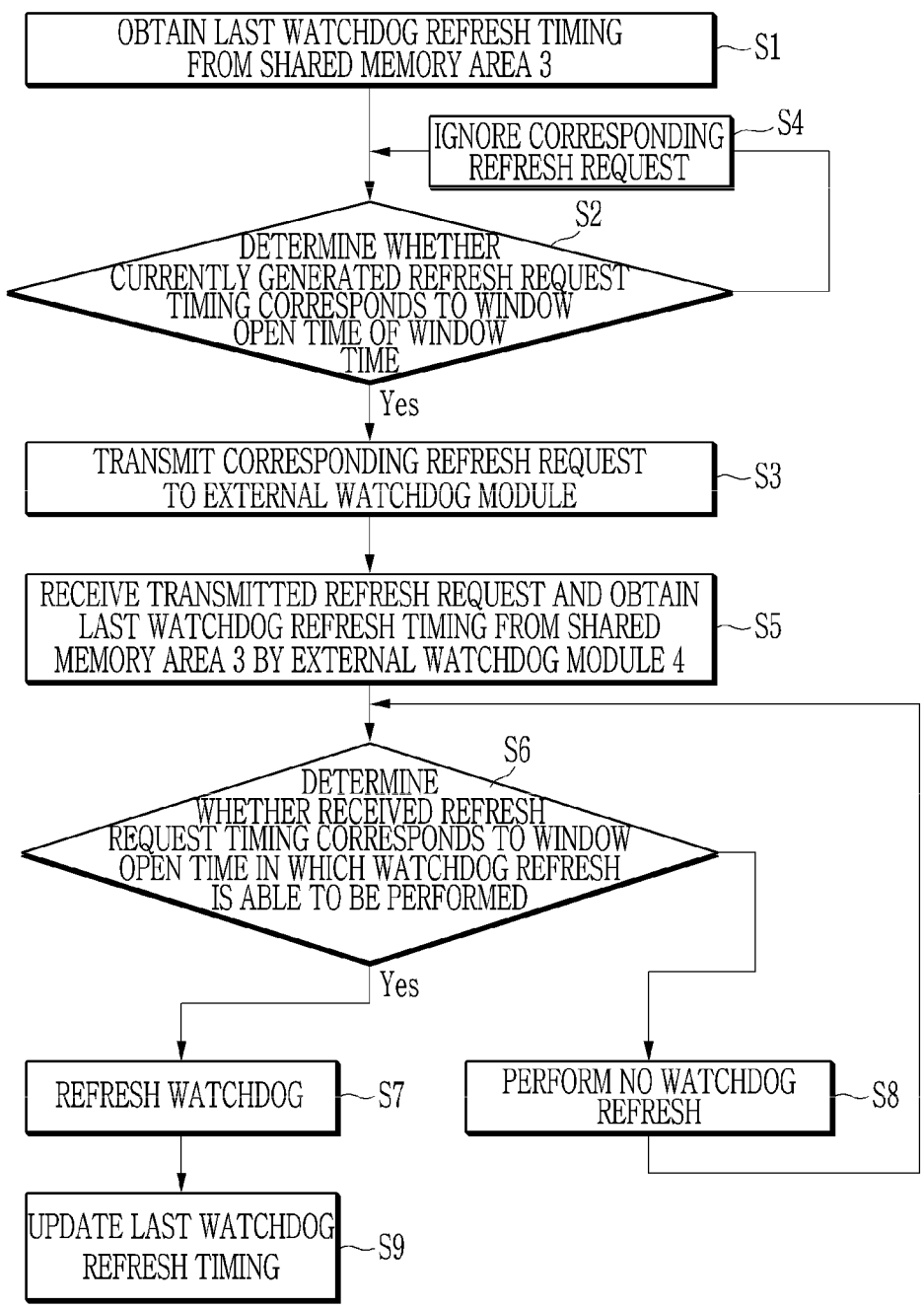
FIG. 2 is a flowchart showing the operations of a main control unit (MCU) and an external watchdog module according to an exemplary embodiment.

FIG. 2 is a flowchart showing the operations of a main control unit (MCU) and an external watchdog module according to an exemplary embodiment.

As shown in FIG. 1, the watchdog system may include a main control unit (MCU) 1 and an external watchdog module 4. The main control unit 1 may include a software area 2 and a shared memory area 3. The software area 2 may include a bootloader area 21 and an application area 22.

The shared memory area 3 may store the last watchdog refresh timing transmitted from the external watchdog module 4.

The bootloader area 21 may store a code to update the application area. The application area 22 may be updated based on the code stored in the bootloader area 21 when an application stored in the application area 22 needs to be updated or reprogrammed, a code of the application area 22 is damaged or defective, and the like.

The application area 22 may store a plurality of applications including codes for performing various functions such as measurement, control, and communication.

The bootloader area 21 and the application area 22 may each include a timer to request a watchdog refresh service. As shown in FIG. 1, the bootloader area 21 may include a timer 211, and the application area 22 may include a timer 221. The timers 211 and 221 may each count the passage of time.

The bootloader area 21 and the application area 22 may each receive the last watchdog refresh timing from the shared memory area 3. The bootloader area 21 may determine whether its refresh request timing corresponds to the window open time of the window time based on the time of the timer 211 and the last watchdog refresh timing. The application area 22 may also determine whether its refresh request timing corresponds to the window open time of the window time based on the time of the timer 221 and the last watchdog refresh timing.

The bootloader area 21 and the application area 22 may each generate a refresh request for refreshing its watchdog timer at a predetermined time interval. Neither the bootloader area 21 nor the application area 22 transmits all the refresh requests to the external watchdog module 4. The bootloader area 21 and the application area 22 may each determine whether its refresh request corresponds to the window open time of the window time of the external watchdog module 4, and may then each transmit the refresh request to the external watchdog module 4 if the refresh request timing corresponds to the window open time, and otherwise, do not transmit the request.

A program running in the software area 2 may be changed from the bootloader area 21 to the application area 22 and vice versa. A corresponding area may request the watchdog refresh depending on which area the currently running program corresponds to.

The external watchdog module 4 may set the window time to be synchronized with a timing in which the watchdog is refreshed; may obtain the last watchdog refresh timing from the shared memory area 3 when receiving the watchdog refresh request from the software area 2; may determine if a received refresh request timing corresponds to time in which the watchdog refresh is able to be performed; and refresh the watchdog based on the watchdog refresh request if the watchdog refresh is able to be performed as a result of the determination, or may not perform the watchdog refresh if the watchdog refresh is unable to be performed as the result of the determination.

When the watchdog is refreshed, it may be determined that there is no defect in the main control unit 1 or the external watchdog module 4, and the watchdog may reset a result of counts up to that time and restart the count using an oscillator clock. Conventionally, when a program jump is made from the bootloader area to the application area and vice versa, it is impossible to determine the last watchdog refresh timing, the watchdog refresh request timing does not correspond to the window open time, and it is thus recognized that a defect occurs. An exemplary embodiment of the present invention may store the last watchdog refresh timing in the shared memory area to prevent this problem.

As shown in FIG. 2, either a bootloader area 21 or an application area 22 of a main control unit 1 may first obtain the last watchdog refresh timing from a shared memory area 3 (S1).

Either the bootloader area 21 or the application area 22 may periodically generate a watchdog refresh request, and determine whether a currently generated refresh request timing corresponds to window open time of window time based on a difference between the generated refresh request timing and the obtained last watchdog refresh timing (S2).

As a result of the determination in S2, if the generated refresh request timing corresponds to the window open time, either the bootloader area 21 or the application area 22 may transmit the corresponding refresh request to an external watchdog module 4 (S3).

Whether either the bootloader area 21 or the application area 22 obtains the last watchdog refresh timing from the shared memory area 3 and performs the refresh request may be determined by a program flow in the software area 2. That is, if the program is currently performed in the bootloader area 21, the refresh request is able to be performed in the bootloader area 21, and if the program is currently performed in the application area 22, the refresh request is able to be performed in the application area 22.

As a result of the determination in S2, if the generated refresh request timing does not correspond to the window open time, the refresh request may be ignored (S4), and the next refresh request may be determined in S2.

The external watchdog module 4 may receive the transmitted refresh request and obtain the last watchdog refresh timing from the shared memory area 3 (S5). The external watchdog module 4 may determine whether the received refresh request timing corresponds to time in which a watchdog refresh is able to be performed, i.e. the window open time (S6).

As a result of the determination in S6, if the received refresh request timing corresponds to the window open time in which the watchdog refresh is able to be performed, the external watchdog module 4 may refresh the watchdog based on the watchdog refresh request (S7).

As a result of the determination in S6, if the received refresh request timing corresponds to window close time in which the watchdog refresh is unable to be performed, the external watchdog module 4 does not perform the watchdog refresh (S8). As the time passes, the external watchdog module 4 may return to S6 after S8, and determine whether the received refresh request timing corresponds to the time in which the watchdog refresh is able to be performed.

The timing in which S7 is performed may become the last watchdog refresh timing, the external watchdog module 4 may transmit this timing to the shared memory area 3, and this last watchdog refresh timing may be stored in the shared memory area 3. That is, the last watchdog refresh timing may be updated (S9).

According to an exemplary embodiment, steps S1 through S9 may be continuously repeated.

Figure 3:
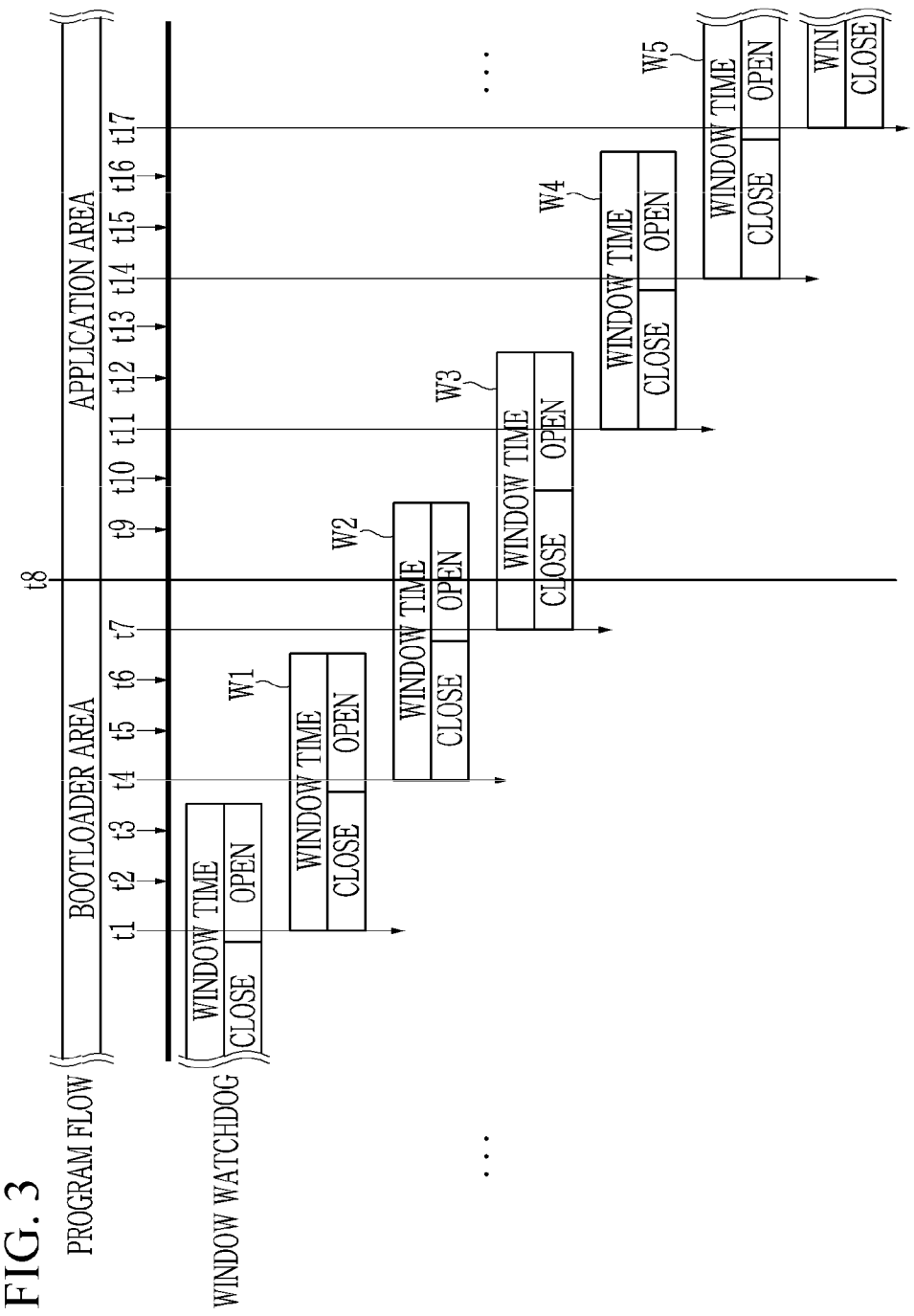
FIG. 3 is a schematic diagram showing that a watchdog refresh is performed according to an exemplary embodiment.

FIG. 3 is a schematic diagram showing that the watchdog refresh is performed according to an exemplary embodiment.

As shown in FIG. 3, a program flow may be described as being changed from the bootloader area 21 to the application area 22 at timing t8.

The bootloader area 21 may generate the refresh request at timing t1, obtain the last refresh timing from the shared memory area 3, and determine that the refresh request timing at timing t1 corresponds to the window open time. The refresh request at timing t1 may then be transmitted to the external watchdog module 4, and the external watchdog module 4 may refresh the watchdog based on the refresh request at timing t1, and start a new window time W1 synchronized with timing t1.

The refresh requests generated at timing t2 and t3 may correspond to refresh close time before refresh open time of the window time W1, and accordingly, the bootloader area 21 does not transmit the corresponding refresh request to the external watchdog module 4.

The bootloader area 21 may generate the refresh request at timing t4, obtain the last refresh timing t1 from the shared memory area 3, and determine that the refresh request timing at timing t4 corresponds to the window open time. The refresh request at timing t4 may then be transmitted to the external watchdog module 4, and the external watchdog module 4 may refresh the watchdog based on the refresh request at timing t4, and start a new window time W2 synchronized with timing t4.

The refresh requests generated at timings t5 and t6 may be ignored in the same manner, the refresh request generated at timing t7 may be transmitted to the external watchdog module 4, and the external watchdog module 4 may refresh the watchdog based on the refresh request at timing t7, and start a new window time W3 synchronized with timing t7.

At timing t8, the program flow may be changed from the bootloader area 21 to the application area 22.

The application area 22 may generate the refresh request at timing t9, obtain the last refresh timing t7 from the shared memory area 3, determine that the refresh request timing at timing t9 corresponds to the window close time before the window open time of the window time W3, and ignore the refresh request at timing t9. The refresh request generated at timing t10 may also be ignored in the same manner.

The application area 22 may generate the refresh request at timing t11, obtain the last refresh timing t7 from the shared memory area 3, and determine that the refresh request timing at timing t11 corresponds to the window open time. The refresh request at timing t11 may then be transmitted to the external watchdog module 4, and the external watchdog module 4 may refresh the watchdog based on the refresh request at timing t11, and start a new window time W4 synchronized with timing t11.

The refresh requests generated at timings t12 and t13 may be ignored in the same manner, the refresh request generated at timing t14 may be transmitted to the external watchdog module 4, and the external watchdog module 4 may refresh the watchdog based on the refresh request at timing t14, and start a new window time W5 synchronized with timing t14.

Figure 4:
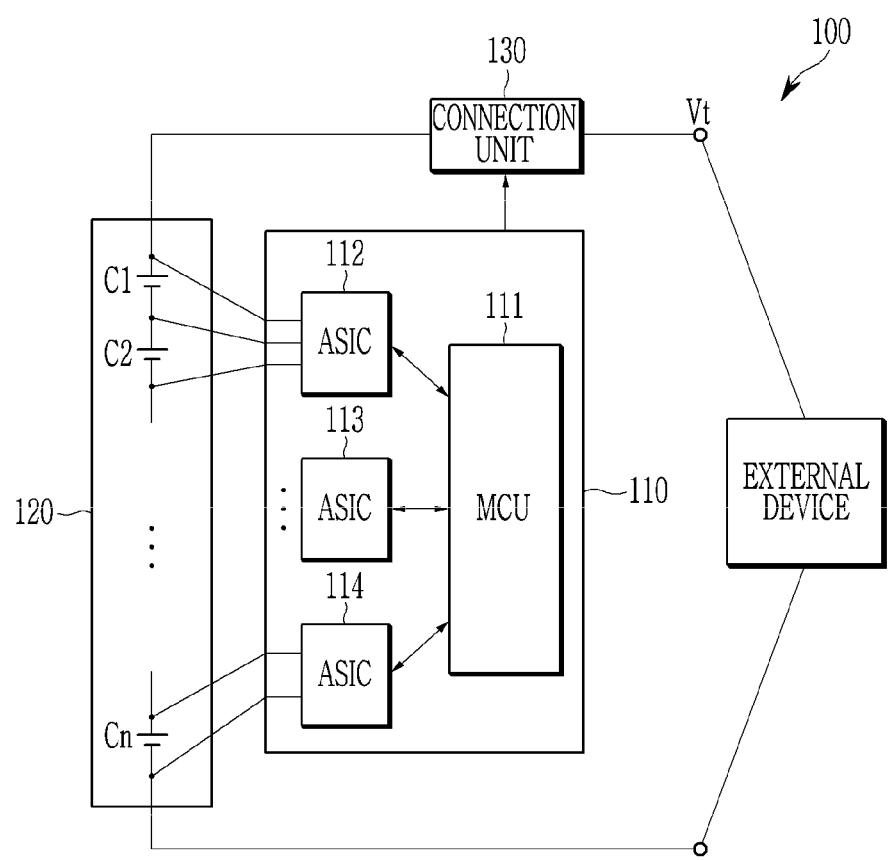
FIG. 4 is a diagram showing a battery system including a main control unit and an external watchdog module, to which an exemplary embodiment is applied.

FIG. 4 is a diagram showing a battery system including a main control unit and an external watchdog module, to which an exemplary embodiment is applied.

Figure 5:
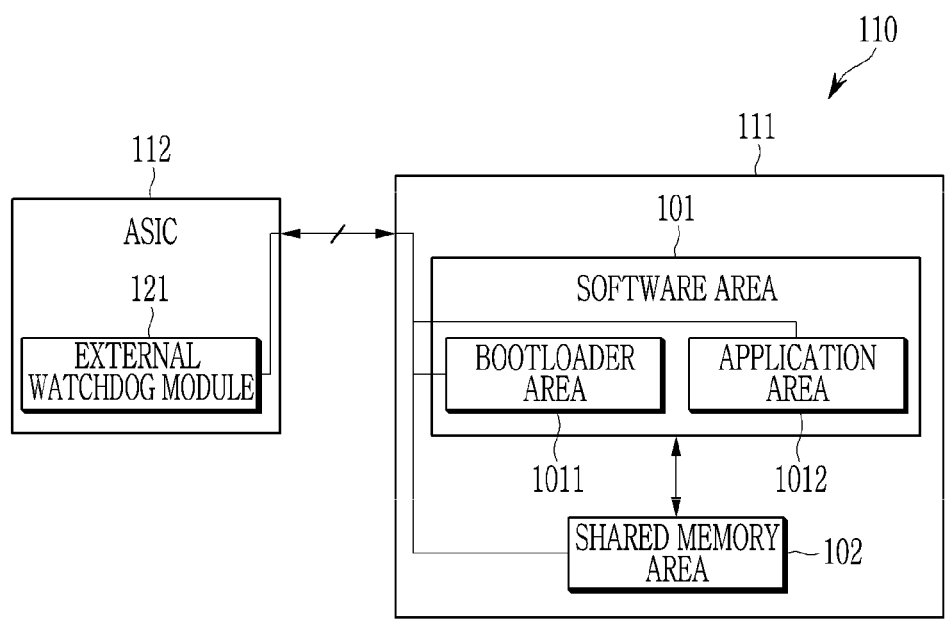
FIG. 5 is a diagram showing the configuration of a battery management system according to an exemplary embodiment.

FIG. 5 is a diagram showing the configuration of a battery management system according to an exemplary embodiment.

A battery system 100 may include a battery management system (BMS) 110, a battery pack 120, and a connection unit 130.

The BMS 110 may collect and analyze various information on the battery system, including information on a plurality of battery cells C1 to Cn, thereby controlling charging and discharging of the battery system, a battery cell balancing, a battery protection operation, etc.

The battery pack 120 may include the plurality of battery cells C1 to Cn electrically connected to each other. The plurality of battery cells C1 to Cn included in the battery pack 120 may be electrically connected to the BMS 110 through a plurality of wires. For example, in the battery pack 120 shown in FIG. 4, a predetermined number of battery cells may be connected in series with each other to form a battery module, and a predetermined number of battery modules may be connected in series or in parallel with each other to form the battery pack.

The connection unit 130 may be implemented as a relay or an n-channel type transistor, and may be connected in series between the battery pack 120 and an external device. The connection unit 130 may be operated by a signal supplied from the BMS 110.

The BMS 110 may include a main control unit (MCU) 111 and a plurality of application-specific integrated circuits (ASICs) 112 to 114. The plurality of ASICs 112 to 114 may each be connected to a corresponding battery cell among the plurality of battery cells C1 to Cn to measure a voltage of the battery cell under the control of the MCU 111, to perform the battery cell balancing for the cell that needs the balancing among the battery cells, and to measure a temperature of the battery cell. FIG. 4 shows the three ASICs 112 to 114, which is an example, and the number of the ASICs may depend on the number of the cells included in the battery pack 120.

The MCU 111 may include a software area 101 and a shared memory area 102, and the software area 101 may be implemented in the same manner as the software area 2 described with reference to FIGS. 1 to 3.

An application stored in an application area 1012 of the software area 101 may be performed, and the MCU 111 may be operated by the application. A plurality of applications required for battery monitoring and management may be stored in the application area 1012, and the MCU 111 may be driven by a performed application. For example, the application area 1012 may include an application for estimating the charging state and lifespan of the battery pack, an application for detecting information on the state of the battery pack, such as a current of the battery pack and the voltage and temperature of the battery cell. In addition, the application area 1012 may include an application for controlling the battery cell balancing, the charging and discharging of the battery, the battery protection operation, etc. That is, the application area 1012 may store the various applications for controlling the plurality of ASICs 112 to 114 to collect the information on the state of the battery pack, and for controlling the MCU 111 to process the collected information and perform the operations (battery cell balancing, charging/discharging of the battery, and the like) necessary for managing the battery pack.

As shown in FIG. 5, an external watchdog module 121 may be implemented in at least one ASIC 112 among the plurality of ASICs 112 to 114.

As shown in FIG. 5, the external watchdog module 121 of the ASIC 112, and the bootloader area 1011, application area 1012, and shared memory area 102 of the MCU 111 may be implemented in the same manner as described above with reference to FIGS. 1 to 3.

Conventionally, the watchdog refresh is able to be performed only during the exact window open time, and a routine for the watchdog refresh may thus be inserted into a specific task in consideration of a window size. When the window size is 32 ms and the window is open from 16 ms to 32 ms, a refresh request may be inserted into a task of 25 ms to be normally operated. However, if a program jump is made between different software components, it is impossible to determine the task timing, the last watchdog refresh timing and the like, thereby causing an accidental watchdog failure.

The above problem may be solved through the exemplary embodiments described in the present invention.

Although the exemplary embodiments of the present invention have been described in detail hereinabove, the scope of the present invention is not limited thereto. Various modifications and improvements made by those skilled in the art to which the present invention pertains also belong to the scope of the present invention.

The invention claimed is:

1. A watchdog system comprising:
a main control unit (MCU) of a battery management system (BMS) including:
a software area including a bootloader area and an application area, wherein either of the bootloader area and the application area is configured to:
generate a watchdog refresh request,
transmit the watchdog refresh request to an external watchdog module, and
determine whether a received refresh request timing of the transmitted watchdog refresh request corresponds to a window open time in which a watchdog refresh is able to be performed by the external watchdog module; and
a shared memory area storing a last watchdog refresh timing transmitted from the external watchdog module; and
the external watchdog module configured to:
receive the generated watchdog refresh request, and
refresh a watchdog based on the watchdog refresh request in response to the received refresh request timing corresponding to the window open time as a result of the determination of the external watchdog module.

2. The watchdog system of claim 1, wherein either the bootloader area or the application area is further configured to:
determine whether the refresh request timing corresponds to the window open time based on a timing in which the watchdog refresh request is generated and the last watchdog refresh timing obtained from the shared memory area, and
transmit the watchdog refresh request to the external watchdog module in response to the generated refresh request timing corresponding to the window open time.

3. The watchdog system of claim 1, wherein
the external watchdog module is configured to update a timing in which the watchdog is refreshed as the last watchdog refresh timing in the shared memory area.

4. The watchdog system of claim 1, wherein
the MCU is configured to determine which one of the bootloader area and the application area performs the refresh request and obtains the last watchdog refresh timing from the shared memory area based on a program flow in the software area.

5. A watchdog method of a watchdog system including a bootloader area, an application area, a shared memory area, and an external watchdog module, the watchdog method comprising:
transmitting a watchdog refresh request to the external watchdog module by either the bootloader area or the application area;
obtaining a last watchdog refresh timing from the shared memory area;
determining whether a received refresh request timing of the transmitted watchdog refresh request corresponds to a window open time in which a watchdog refresh is able to be performed, by the external watchdog module;
refreshing the watchdog based on the watchdog refresh request in response to the received refresh request timing corresponding to the window open time as a result of the determination of the external watchdog module; and
storing a timing of the refreshing of the watchdog in the shared memory area as the last watchdog refresh timing.

6. The watchdog method of claim 5, further comprising:
performing no watchdog refresh in response to the received refresh request timing corresponding to window close time in which the watchdog refresh is unable to be performed as a result of the determination of the external watchdog module.

7. The watchdog method of claim 5, wherein:
the transmitting of the watchdog refresh request to the external watchdog module by either the bootloader area or the application area includes:
generating the watchdog refresh request, and obtaining the last watchdog refresh timing from the shared memory area, by either the bootloader area or the application area;
determining whether a generated refresh request timing corresponds to the window open time based on a difference between the generated refresh request timing and the obtained last watchdog refresh timing, by either the bootloader area or the application area; and
transmitting the watchdog refresh request to the external watchdog module in response to the generated refresh request timing corresponding to the window open time as a result of the determination of either the bootloader area or the application area.

8. The watchdog method of claim 7, wherein
the transmitting of the watchdog refresh request to the external watchdog module by either the bootloader area or the application area further includes ignoring the watchdog refresh request in response to the generated watchdog refresh request timing not corresponding to the window open time, as a result of the determination of either the bootloader area or the application area.

9. The watchdog method of claim 5, further comprising determining which one of the bootloader area and the application area performs the watchdog refresh request and obtains the last watchdog refresh timing from the shared memory area based on a program flow in the software area.

10. A battery management system managing a battery pack including a plurality of battery cells, the battery management system comprising:
at least one application-specific integrated circuit (ASIC) measuring voltages of the plurality of battery cells and performing cell balancing for the plurality of battery cells; and a main control unit (MCU) controlling the at least one ASIC, wherein the MCU includes:
- a software area including a bootloader area and an application area, wherein either of the bootloader area and the application area is configured to:
  - generate a watchdog refresh request,
  - transmit the watchdog refresh request to an external watchdog module, and
  - determine whether a received refresh request timing of the transmitted watchdog refresh request corresponds to a window open time in which a watchdog refresh is able to be performed by the external watchdog module; and
- a shared memory area storing a last watchdog refresh timing transmitted from an external watchdog module, and the at least one ASIC includes:

an external watchdog module receiving the generated watchdog refresh request and refreshing a watchdog based on the watchdog refresh request in response to the received refresh request timing corresponding to the window open time as a result of the determination of the external watchdog module.

11. The battery management system of claim 10, wherein either the bootloader area or the application area is configured to:
- determine whether its refresh request timing corresponds to the window open time based on a timing in which the watchdog refresh request is generated and the last watchdog refresh timing obtained from the shared memory area, and
- transmit the watchdog refresh request to the external watchdog module if the generated refresh request timing corresponds to the window open time.

12. The battery management system of claim 10, wherein the external watchdog module updates a timing in which the watchdog is refreshed as the last watchdog refresh timing in the shared memory area.

13. The battery management system of claim 10, wherein either the bootloader area or the application area is determined based on a program flow in the software area.

* * * * *